US008429444B2

(12) United States Patent
Rancurel et al.

(10) Patent No.: US 8,429,444 B2
(45) Date of Patent: Apr. 23, 2013

(54) MULTIPURPOSE STORAGE SYSTEM BASED UPON A DISTRIBUTED HASHING MECHANISM WITH TRANSACTIONAL SUPPORT AND FAILOVER CAPABILITY

(75) Inventors: Vianney Rancurel, La Frette sur Seine (FR); Olivier Lemarie, Sunnyvale, CA (US); Giorgio Regni, Paris (FR); Alain Tauch, Montrouge (FR); Benoit Artuso, Paris (FR); Jonathan Gramain, Paris (FR); Bertrand Demiddelaer, Levaillois-Perret (FR)

(73) Assignee: Scality, S.A., Paris (FR)

( * ) Notice: Subject to any disclaimer, the term of this patent is extended or adjusted under 35 U.S.C. 154(b) by 0 days.

(21) Appl. No.: 12/640,373

(22) Filed: Dec. 17, 2009

(65) Prior Publication Data
US 2010/0162035 A1    Jun. 24, 2010

Related U.S. Application Data

(60) Provisional application No. 61/138,759, filed on Dec. 18, 2008.

(51) Int. Cl.
*G06F 11/00*    (2006.01)
(52) U.S. Cl.
USPC ............. 714/4.1; 714/4.4; 714/4.11; 714/6.2
(58) Field of Classification Search ............... 714/4.11, 714/4.1, 4.4, 6.2
See application file for complete search history.

(56) References Cited

U.S. PATENT DOCUMENTS

| | | | | |
|---|---|---|---|---|
| 6,094,713 A * | 7/2000 | Khadder et al. | ............ | 711/210 |
| 6,983,322 B1 * | 1/2006 | Tripp et al. | ................... | 709/225 |
| 7,251,663 B1 * | 7/2007 | Smith | ................. | 1/1 |
| 7,389,305 B1 * | 6/2008 | Kindig et al. | ......................... | 1/1 |
| 7,433,928 B1 | 10/2008 | Ranade et al. | | |
| 7,788,225 B2 * | 8/2010 | Fish et al. | ..................... | 707/624 |
| 8,139,508 B1 * | 3/2012 | Roskind | ....................... | 370/255 |
| 2006/0239275 A1 * | 10/2006 | Zlateff et al. | ................. | 370/400 |
| 2007/0133554 A1 * | 6/2007 | Ederer et al. | ............... | 370/395.3 |
| 2007/0156842 A1 * | 7/2007 | Vermeulen et al. | .......... | 709/217 |
| 2007/0233832 A1 * | 10/2007 | Narayanan et al. | ........... | 709/223 |
| 2008/0005203 A1 * | 1/2008 | Bots et al. | ..................... | 707/205 |
| 2008/0123664 A1 * | 5/2008 | Schwan et al. | ........... | 370/395.32 |
| 2008/0172563 A1 * | 7/2008 | Stokes | ......................... | 713/193 |

(Continued)

OTHER PUBLICATIONS

Kristian Waagan: "Building a Replicated Data Store Using Berkeley DB and the Chord DHT" Internet Citation; Aug. 22, 2005, pp. 1-91, XP002504247—Retrieved from the Internet: URL:htt:p//www.diva-portal.org/ntnu/abstract.xsql?dbid=624 [retrieved on Dec. 5, 2008].

(Continued)

*Primary Examiner* — Loan L. T. Truong
(74) *Attorney, Agent, or Firm* — Blakely Sokoloff Taylor & Zafman LLP

(57) ABSTRACT

A multipurpose storage system based upon a distributed hashing mechanism with transactional support and failover capability is disclosed. According to one embodiment, a system comprises a client system in communication with a network, a secondary storage system in communication with the network, and a supervisor system in communication with the network. The supervisor system assigns a unique identifier to a first node system and places the first node system in communication with the network in a location computed by using hashing. The client system stores a data object on the first node system.

28 Claims, 20 Drawing Sheets

U.S. PATENT DOCUMENTS

| | | | |
|---|---|---|---|
| 2008/0215663 A1* | 9/2008 | Ushiyama | 709/201 |
| 2008/0222154 A1* | 9/2008 | Harrington et al. | 707/10 |
| 2009/0041017 A1* | 2/2009 | Luk | 370/392 |
| 2009/0049523 A1* | 2/2009 | LiVecchi et al. | 726/4 |
| 2009/0094380 A1* | 4/2009 | Qiu et al. | 709/239 |
| 2009/0187757 A1* | 7/2009 | Kerschbaum | 713/153 |
| 2010/0110935 A1* | 5/2010 | Tamassia et al. | 370/256 |
| 2011/0022883 A1* | 1/2011 | Hansen | 714/4 |

OTHER PUBLICATIONS

Ion Stoica et al: "Chord: A Scalable Peer-to-Peer Lookup Protocol for Internet Applications" IEEE / ACM Transactions on Networking, IEEE / ACM, New York, NY, US, vol. 11, No. 1, Feb. 1, 2003, XP011077215 ISSN: 1063-6692, p. 1-7.

WO, PCT/US2010/068565—Search Report, Jul. 10, 2010.

* cited by examiner

FIG. 7A

| RET. CODE\TRANS TYPE 701 | GET_REQUEST 702 | PUT_REQUEST 703 | DELETE_REQUEST 704 |
|---|---|---|---|
| ERROR | | | |
| TRANSEXIST | | | |
| FREE | Y | X | X |
| EXIST | X | | X |
| PENDING_GET | X | | |
| PENDING_PUT | | | |
| PENDING_DELETE | | | |

FIG. 7B

| RET. CODE\TRANS TYPE 701 | Local node 705 | Remote node 706 |
|---|---|---|
| GET_REQUEST 702 | X | |
| GET_REQUEST 702 | Y | X |
| PUT_REQUEST 703 | X | X |
| DELETE_REQUEST 704 | X | |

FIG. 18A

| COMMAND 1801 | DESCRIPTION 1802 |
|---|---|
| RESERVE TRANSID TRANSTYPE CHUNKID | Reserve a chunk ID and replicas for trans types (*), returns (**) |
| GET TRANSID CHUNKID | Get a chunk or one of its replica with a transaction |
| GET_LOCAL CHUNKID | Get a chunk without transaction |
| PUT TRANSID CHUNKID | Put a chunk and all of its replicas with a transaction |
| PUT_LOCAL CHUNKID | Put a chunk without transaction |
| DELETE TRANSID CHUNKID | Delete a chunk and its replicas with a transaction |
| DELETE_LOCAL CHUNKID | Delete a chunk without transaction |
| CHECK_LOCAL CHUNKID | Check a chunk status (existence, deletion, transaction pending) (*) |

FIG. 18B

| (*) TRANSACTION TYPE 1803 | DESCRIPTION 1804 |
|---|---|
| GET_REQUEST | Get a chunk |
| PUT_REQUEST | Put a chunk |
| DELETE_REQUEST | Delete a chunk |

FIG. 18C

| (**) RETURN CODE 1805 | DESCRIPTION 1806 |
|---|---|
| ERROR | Transaction validation failed |
| TRANSEXIST | A transaction is already registered (For RESERVE only) |
| FREE | Chunk ID is available for operation |
| EXIST | Chunk ID already exists on disk |
| PENDING_GET | A GET transaction is pending |
| PENDING_PUT | A PUT transaction is pending |
| PENDING_DELETE | A DELETE transaction is pending |

FIG. 19

| COMMAND 1901 | DESCRIPTION 1902 |
|---|---|
| ASSIGN ID | Assign the given ID to the new node |
| COUNT X-Y | Count the chunks in the range X-Y |
| JOIN NIL\|X | Tell the node to join bootstrap node X or NIL if first on the ring |
| JOB_CANCEL X | Cancel a MOVE, PURGE or REBUILD job |
| LEAVE | Tell the node to leave the ring |
| MOVE X-Y Z | Move the chunks in the range X-Y to Z |
| PROXY X-Y Z C\|S | Some chunks in the range X-Y are needed/available for/on Z (Server/Client) |
| PURGE TIME | Pysically delete chunks older than TIME |
| REBUILD TIME | Rebuild replicas N+1 for chunks older than TIME |
| STATUS | Return various information on node (ID, state, ranges) |

MULTIPURPOSE STORAGE SYSTEM BASED UPON A DISTRIBUTED HASHING MECHANISM WITH TRANSACTIONAL SUPPORT AND FAILOVER CAPABILITY

The present application claims the benefit of and priority to U.S. Provisional Patent Application No. 61/138,759 entitled "MULTIPURPOSE STORAGE SYSTEM BASED UPON A DISTRIBUTED HASHING MECHANISM WITH TRANSACTIONAL SUPPORT AND FAILOVER CAPABILITY" filed on Dec. 18, 2008, and is hereby, incorporated by reference.

FIELD

The field of the invention relates generally to computer storage systems. In particular, the present method and system is directed to a multipurpose storage system based upon a distributed hashing mechanism with transactional support and failover capacity.

BACKGROUND

As storage needs increases, solutions have to be found to drive the cost of storage down and maintain ease of management. The use of a Chord based network (a peer-to-peer technology) partially solves certain problems. The use of self organizing finger tables solves the problem of scaling by avoiding the need of centralized information. The use of intelligent routing limits the number of request to reach a node. The use of consistent hashing also limits the impacts of modifying the network topology (when adding or removing nodes, when nodes fail).

The use of a Chord network ensures overall consistency of routing (except some limitations), self-organizing stabilization but does not provide a real way to replicate information, nor to rebalance content in case of topology change.

Best practice solutions move the complexity of managing storage into dedicated storage systems to save application servers from embedding storage disks directly, avoiding many inconveniences such as disk failure management, data loss, data reconstruction, and enabling economics of scale by better managing a shared pool of storage resources. Typical technologies include:

SAN, Storage Area Networks where storage is centralized into large dedicated proprietary storage cabinets that export their storage capacity in the form of block device volumes NAS, Network Attached Storage where medium sized storage devices export their disks as network file systems.

Object stores that do not follow the centralized architecture design can be deployed on a large cluster of generic servers, pushing fault tolerance on the software and the network stack rather than dedicated storage hardware.

Because SAN technology is block based as opposed to file based and slices storage capacity into monolithic volumes, solutions derived from this technology cannot perform storage optimization based on files or objects and have to manipulate small anonymous binary blobs called blocks with very little metadata attached to them. Recent improvements such as thin provisioning, i.e. over allocation of storage space for each volume to minimize the need for growing existing volumes are natural evolutions.

Object stores are re-emerging and put more emphasis on metadata and file awareness to push more intelligence into the storage solution including file access patterns and domain specific metadata that can be utilized to implement per file classes of storage. For example, an email platform using an object store instead of a volume based approach could add metadata declaring a message as legitimate, undesired or high priority. The object store could use the metadata to change classes of storage appropriately. For example, the system may maintain only one copy of illegitimate messages or keep high priority messages in cache for faster access.

SUMMARY

A multipurpose storage system based upon a distributed hashing mechanism with transactional support and failover capability is disclosed. According to one embodiment, a system comprises a client system in communication with a network, a secondary storage system in communication with the network, and a supervisor system in communication with the network. The supervisor system assigns a unique identifier to a first node system and places the first node system in communication with the network in a location computed by using hashing. The client system stores a data object on the first node system.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIGS. 7a and 7b illustrate exemplary transaction validation tables within a multipurpose storage system, according to one embodiment.

FIG. 18a is an exemplary list of commands within a multipurpose storage system, according to one embodiment.

FIG. 18b is an exemplary list of transaction types within a multipurpose storage system, according to one embodiment.

FIG. 18c is an exemplary list of return codes within a multipurpose storage system, according to one embodiment.

FIG. 19 is an exemplary list of commands used in supervisor protocol within a multipurpose storage system, according to one embodiment.

Figure 1:
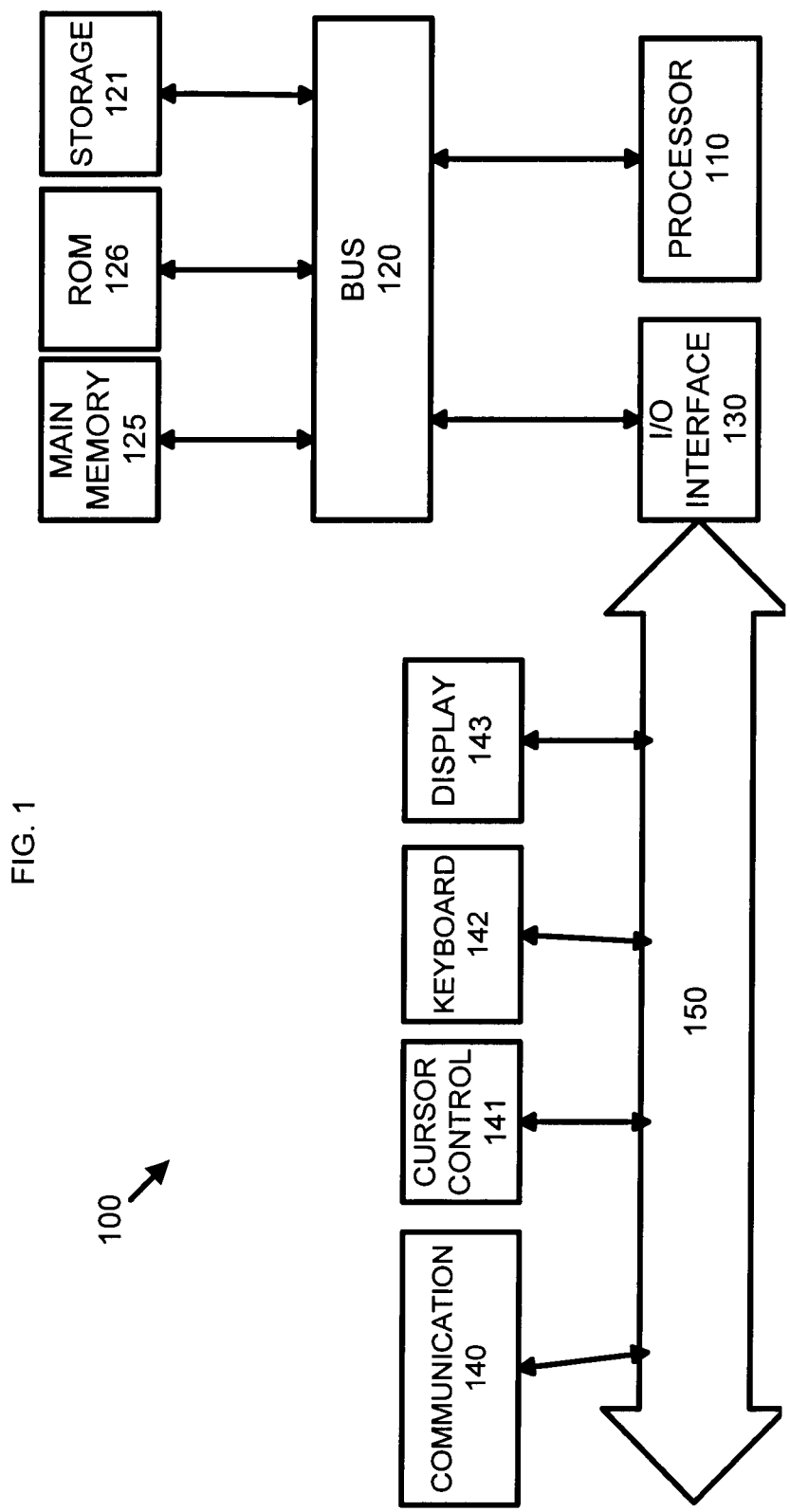
FIG. 1 illustrates an exemplary computer architecture for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A multipurpose storage system based upon a distributed hashing mechanism with transactional support and failover capability is disclosed. According to one embodiment, a system comprises a client system in communication with a network, a secondary storage system in communication with the network, and a supervisor system in communication with the network. The supervisor system assigns a unique identifier to a first node system and places the first node system in communication with the network in a location computed by using hashing. The client system stores a data object on the first node system.

Chord based technology does not provide a way to manage fault tolerance and availability of content in cases of node joins, leaves or failures. This limitation is overcome by using a clear assignation system for node ID's, chunk ID's and replica ID's and by using a transactional system that: (1) guarantees to store a chunk and all of its replicas, (2) guarantees to retrieve a chunk or one of its replicas in case of a node failure and (3) guarantees to delete a chunk and all of its replicas.

Chord based technology does not provide a way to automatically circumvent or repair a ring that is temporarily missing nodes (and content), that has misplaced information (in case of node reappearance) or definitive content failure. This limitation is overcome by using supervising computers that trigger automatic rebalancing (MOVE) and also detect chunk range overlaps. The supervising computers send information to node computers that improve availability of content.

The present embodiments provide a scalable storage system with no central point. The present system has the advantages of using low expenditure devices (e.g. cheap micro computers using cheap SATA disks) to build low cost, robust and scalable storage systems.

The present system and method uses a Chord network as a key/value store. Included in the present system are a replication system, and transactional support. Ensured are automatic redundancy, persistence and availability of content, and aging and packing of content before sending it to an archival system. The present embodiments further concern a corresponding computer software product, a key/value storage device, a message store device and a dynamic content caching device.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

Figure 2:
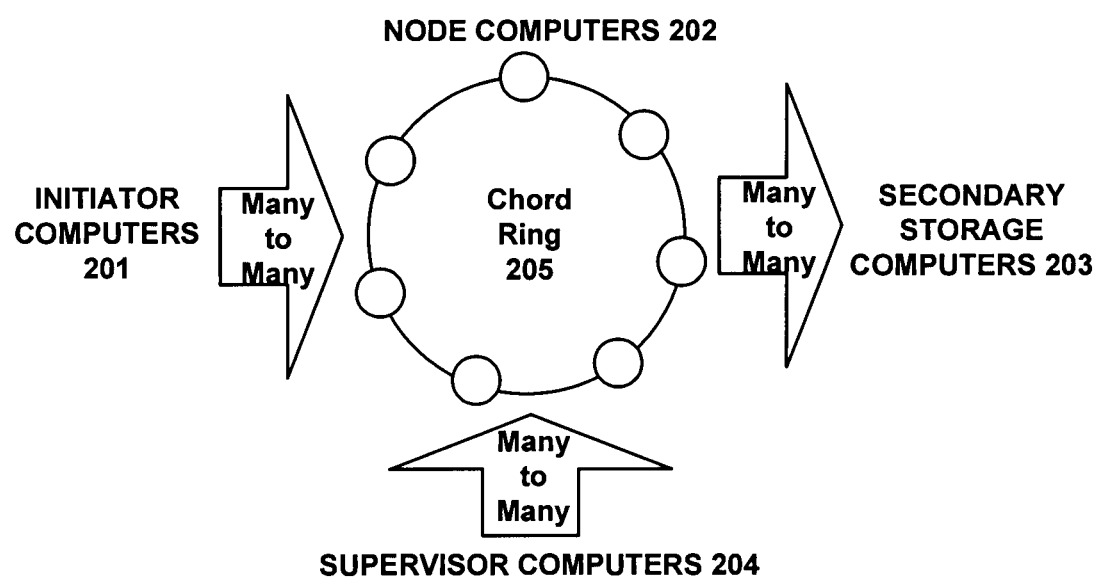
FIG. 2 illustrates an exemplary multi purpose storage system, according to one embodiment.

FIG. 2 illustrates an exemplary multi purpose storage system, according to one embodiment. An exemplary multipurpose storage system comprises initiator computers 201 and node computers 202, supervisor computers 204, and secondary storage computers 203. The computers included in the exemplary multipurpose storage system can have an architecture as described in FIG. 1, according to one embodiment. The computers of the system are arranged around a chord ring 205.

Due to the particularity of the Chord algorithm, communication occurs point to point from potentially many servers to many different servers (many to many) with no central communication point, the global performance of the present system does not depend on the number of these components.

The present system does not require the use of supervisor computers 204 during normal operation. Normal operation is characterized by storing chunks, retrieving chunks, deleting chunks, handling a given number of failures, among other operations. Thus the node computers 202 do not view supervisor computers 204 until the latter have connected to them. Supervisor computers 204 are used for inserting node computers 202, deleting node computers 202, improving overall synchronization of the different components, and offering a system administration view of the present system.

Initiator computers 201 are the interface to the outside world and they are clients to the present system. They support access to the system with the following protocols: key/value store interface by using a custom transactional "Chord client API", or FUSE.

Secondary storage systems 203 can be other Chord rings (similar to 205), SAN's, or dispersed storage installations.

According to one embodiment, the present system is deployed as a standalone storage solution (without the usage of a secondary storage), or as a storage cache when secondary storage is present. In the latter case an aging and packing mechanism is used as described below in conjunction with FIGS. 20a and 20b.

Figure 3:
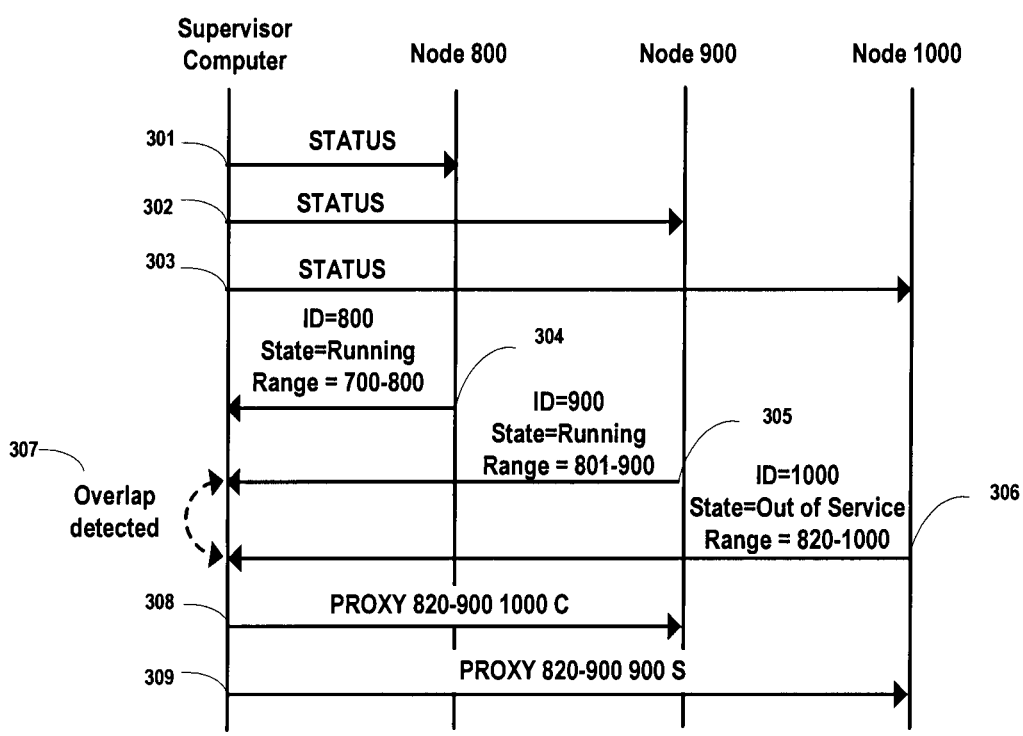
FIG. 3 illustrates an exemplary supervisor computer status request within a multipurpose storage system, according to one embodiment.

FIG. 3 illustrates an exemplary supervisor computer status request within a multipurpose storage system, according to one embodiment. A supervisor requests the status of nodes 800, 900, and 1000 with a "Status" command of the supervisor protocol (301, 302, 303, respectively). A node computer's state may be "running" or "out of service." In the first case it means they are in the Chord ring. In the second case they are not in the ring but potentially able to MOVE data (see FIG. 15).

Node 800 responds with its ID, state, and range 304. Node 900 responds with its ID, state, and range 305. Node 1000 responds with its ID, state, and range 306. The range is [$ID_{low}$, $ID_{high}$], or the lowest chunk ID to the highest chunk ID hosted by a node computer. Based upon the received responses the supervisor computer can detect overlaps, and in this example one is detected between Node 900 and Node 1000 307. An overlap is when a node hosts some chunk that it should not host according to its ID information. The supposed range is the range between its predecessor and its own ID (Chord). However, after an operation (for example a join described in FIG. 5) the real range of chunks hosted on a node can be wrong. The supervisor computer corrects an overlap by sending proxy information 308 and 309 to both nodes involved in the overlap. There is a distinction between the client proxy 308 and the server proxy 309. The client proxy needs to fetch some information on the server whilst the server needs to serve some information to the client. There can exist multiple overlaps simultaneously while a node is a proxy client and a proxy server at the same time for different ranges.

Figure 4:
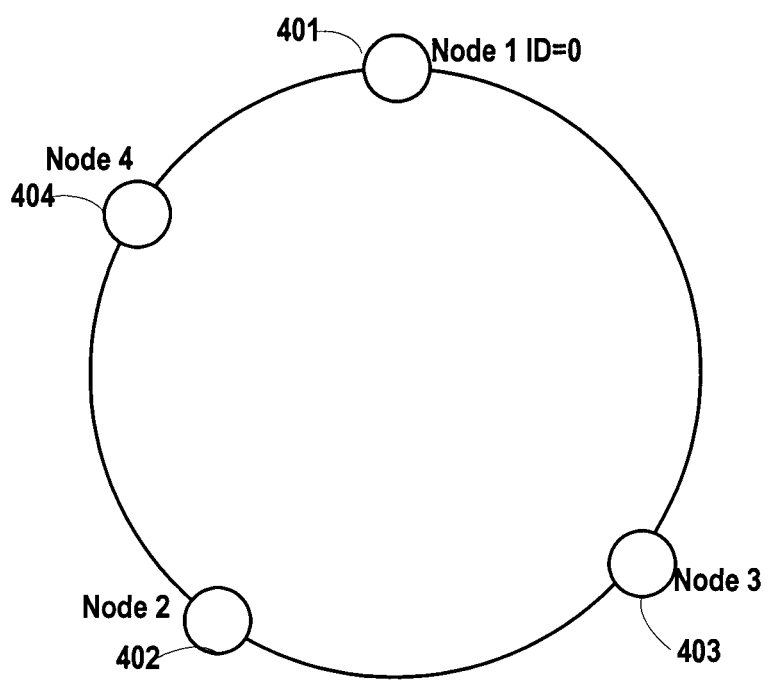
FIG. 4 illustrates exemplary placement of nodes on a ring within a multipurpose storage system, according to one embodiment.

FIG. 4 illustrates an exemplary placement of nodes on a ring within a multipurpose storage system, according to one embodiment. Four nodes are placed on a ring (Node 1 401, Node 2 402, Node 3 403, Node 4 404). The first node ID is set to 0 (represented in FIG. 4 by convention on polar coordinates $(1, \pi/2)$). The other nodes are computed using the following formula:

$$ID_0=0, ID_{n+1}=(ID_x+((ID_y==0)?[2^m-ID_x]:[ID_y-ID_x]))\times \Phi)=2^m$$

where the key space range $ID^x$ and $ID^y$ determines the widest range between two existing nodes on the ring, $ID^y > ID^x$ on the directed ring, $\phi$ being a real number, and m the number of bits in the Chord key space $2^m$.

For a given distributed chunk ID's (see FIG. 6) this configuration allows the best distribution (better than a normal distribution) of chunks when the number of nodes (n) in the ring is less than 1000 (typical for a medium scale application). If n is greater than 1000 then random placement of a node ID's is chosen. Random placements revert to a normal distribution of chunks.

Figure 5:
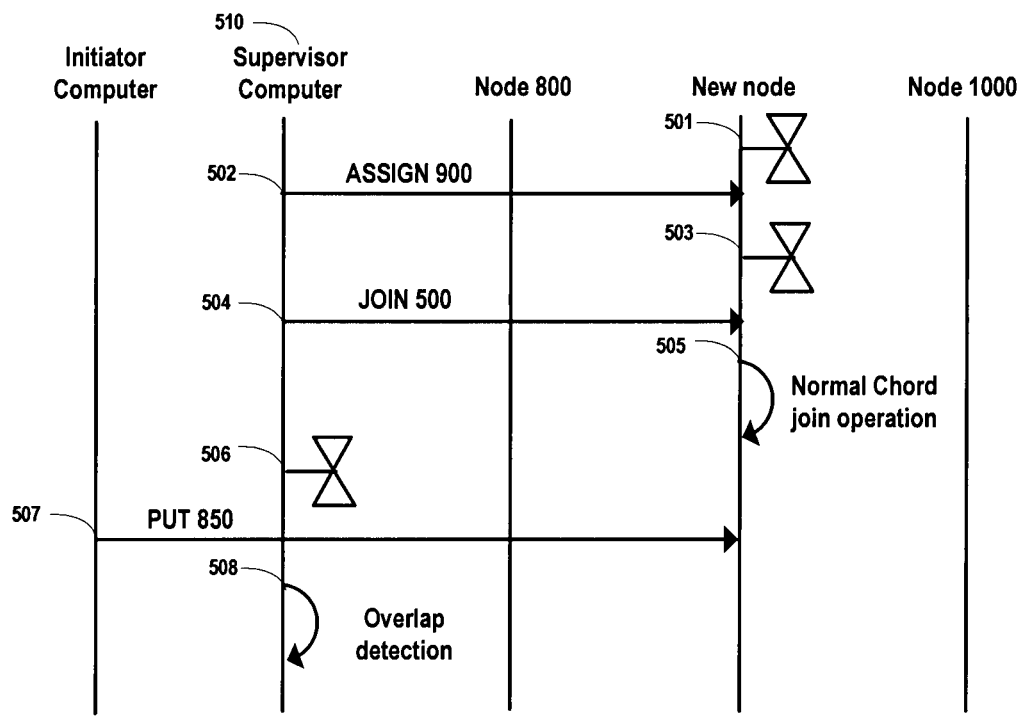
FIG. 5 illustrates an exemplary node join process within a multipurpose storage system, according to one embodiment.

FIG. 5 illustrates an exemplary node join process within a multipurpose storage system, according to one embodiment. A join operation, in this example, is initiated by a supervisor computer 510. A new node 900 is physically connected to the network 501 and reachable by other computers of the present system. The new node waits 501 for a supervisor protocol (or assign) command 502. A node ID is assigned (here 900) 502, and the node waits again 503 for another command from the supervisor 510. A JOIN command is received 504 from the supervisor 510 and the node performs a classical JOIN on the Chord ring (here through a bootstrap node 500, as an example). It is possible for the supervisor 510 to not detect overlaps immediately 506 and initiator computers can start storing chunks 507 on the new node. The supervisor 510 eventually detects overlaps 508 and sends the appropriate proxy information.

Figure 6:
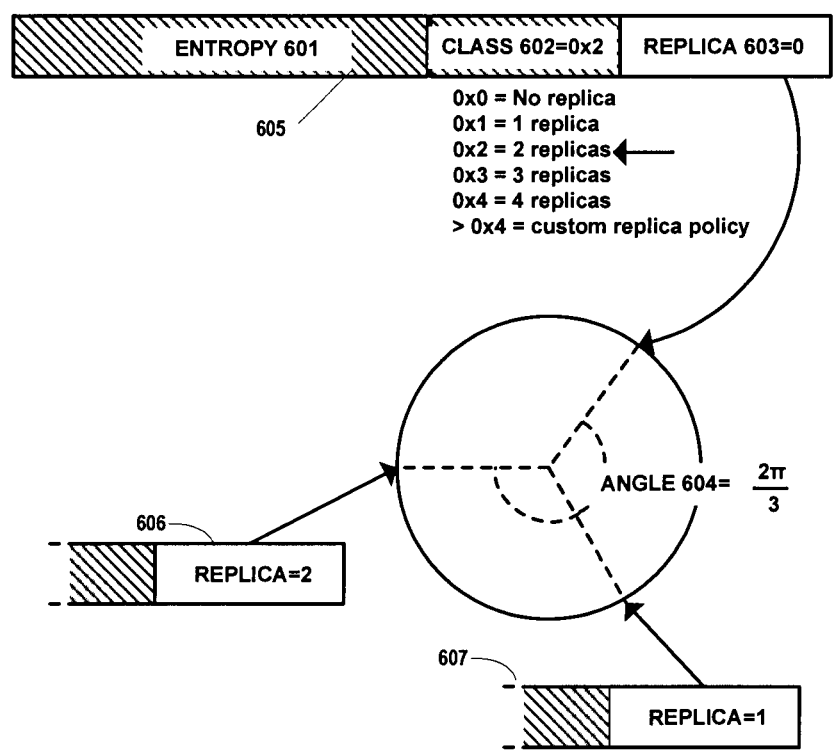
FIG. 6 illustrates an exemplary identifier and replica scheme within a multipurpose storage system, according to one embodiment.

FIG. 6 illustrates an exemplary identifier and replica scheme within a multipurpose storage system, according to one embodiment. A chunk ID 605 has entropy information 601, class information 602, and replica information 603.

Entropy information 601 can be a random number (assigned by an entropy device or by a hash function) or a given number. The number should be equiprobable or approaching equiprobability on the range 0 to $2^{m-p}$, where m is the number of bits of the key space. P=8 is the number of bits for coding class and replica information.

Class information 602 is coded on 4 bits in the chunk ID, according to this example, and defines the number of replicas or a custom replica policy. The main replica is not counted in the number of replicas. The custom replica policies are defined outside the chunk ID and are fetched before being applied.

Replica information 603 is coded on 4 bits. Replica number 0 is the main replica. Other replica ID's (606, 607) are computed using an "angle" 604 that is equivalent to $2\pi$ divided by the total number of replicas. The formula does not depend upon $\pi$ but on modulo arithmetic:

$$\alpha = ID_{(n,i)} >> p$$

$$q = m - p$$

$$\beta =$$
$$(j-i>0)?\left[\left(\alpha+(j-i)\cdot\frac{2^q-1}{R+1}\right)\equiv 2^q\right]:\left[\left(\left(x=\alpha-(i-j)\cdot\frac{2^q-1}{R+1}\right)<0\right)?\right.$$
$$\left.(2^q-1-x):x\right]$$

$$ID_{(n,j)} = \beta << p + [\text{class, replica}]$$

The $j^{th}$ replica given any replica of the $ID_n$, given the number of replica R and m the number of bits in the Chord key space $2^m$, p the number of bits coding class and replica information.

As a property of the formula, when a replica ID is known, the chunk ID of any of other replicas may be calculated.

When there is no particular overlap, chunk retrieval is possible because initiator computers find the successor of a node with a classical Chord find_successor( ) operation and ask for the chunk by using GET or GET_LOCAL commands (see command list in FIG. 18).

A specific API called "Chord client API" offers a robust key/value store API to initiator computers that stores, retrieves and deletes data chunks into and from the ring safely by using a transaction concept. All of the described actions have a reservation operation that maintains the integrity of the data: 1) chunk ID preparation on the initiator computer, 2) chunk ID checking and update of transaction table on the node computer, 3) transaction management, 4) command acceptance or rejection, and 5) result/return management.

Chunk ID preparation is done by the caller of the API on the initiator computer. A unique chunk ID is provided that is reserved along with all its replicas. A random chunk ID may be generated or a unique chunk ID may be picked elsewhere. The chunk IDs of all the replicas are also computed by using the formula described in FIG. 6. A RESERVE command is then sent over the network to all the nodes responsible for the chunks after a call to Chord find_successor( ). FIG. 18b shows the different values that the "transaction type" parameter can take when calling the RESERVE operation. Commands are sent in serial or in parallel depending on the transaction type.

Chunk ID checking and update of transaction table is executed on the node computers that receive the RESERVE command. It represents in two actions: checking and updating a transaction table, and verifying whether the requested chunk ID (main chunk ID or replica) already exists or is not on the node.

Transaction management includes sending all the RESERVE requests at once to one or many replicas. This mechanism guarantees that the chunk ID and all its replicas are available for the following GET, PUT or DELETE command. By determining in advance how many replicas are available, a number is determined below which the action is not executed. For example, if the availability of four replicas is checked and only three are found, storing three out of four may be found to be acceptable, and continue processing. On the contrary, if only two replicas out of four are found, the put command may not execute, and retry with different chunk IDs or cancel the operation.

Common acceptance or rejection is at the level of the node computer to guarantee data integrity. Situations exist where a current transaction will forbid some commands that may have been emitted in the meantime (when sending a RESERVE, the transaction should be kept (e.g. an 'X' in FIG. 7a). In all other cases no action will be performed and an error will be returned. When a proxy is set, behavior is described in FIG. 7b. The status of a remote node is checked by the CHECK_LOCAL command, see also FIG. 11). A timeout mechanism keeps the "transaction id" valid for a certain period of time before expiration. The timestamp is set upon reception of the RESERVE request. Upon reception of the second part of the transaction, which is either one of the PUT, GET or DELETE commands, the value of the timestamp is compared to the timeout value. If the value is above the timeout value the transaction is considered invalid and rejected.

Result and return management monitors the status sent to a caller after an attempt to retrieve, store or delete a chunk. FIG. 18c shows the different values that a call to RESERVE can return.

FIGS. 7a and 7b illustrate exemplary transaction validation tables within a multipurpose storage system, according to one embodiment. The table in FIG. 7a illustrates exemplary behavior upon receiving a RESERVE for specific intents GET_REQUEST 702, PUT_REQUEST 703, and DELETE_REQUEST 704. The transaction is kept when there is an 'X' as indicated in the figure. An ERROR occurs when there is a transaction/chunk error. TRANSEXIST indicates that a transaction with the same TRANSID already exists. FREE indicates that the chunk does not exist, while EXIST indicates that the chunk already exists. PENDING_GET indicates there is already a GET transaction on the chunk, PENDING_PUT indicates there is already a PUT transaction on the chunk, and PENDING_DELETE indicates there is already a DELETE transaction on the chunk. In all other cases, no action is performed after the RESERVE command.

The table in FIG. 7b illustrates PROXY behavior upon remote status retrieved using CHECK_LOCAL and by the following explanation of reference to the table in FIG. 7a. For a GET_REQUEST, a transaction is kept only if there is an 'X' on local node AND 'Y' on local node AND 'X' on remote node 702. For a PUT_REQUEST, a transaction is kept only if there is an 'X' on local node 703. For a DELETE_REQUEST, a transaction is kept only if there is an 'X' on local node 704. Note there exists also a CANCEL_REQUEST that removes a pending transaction.

Figure 8:
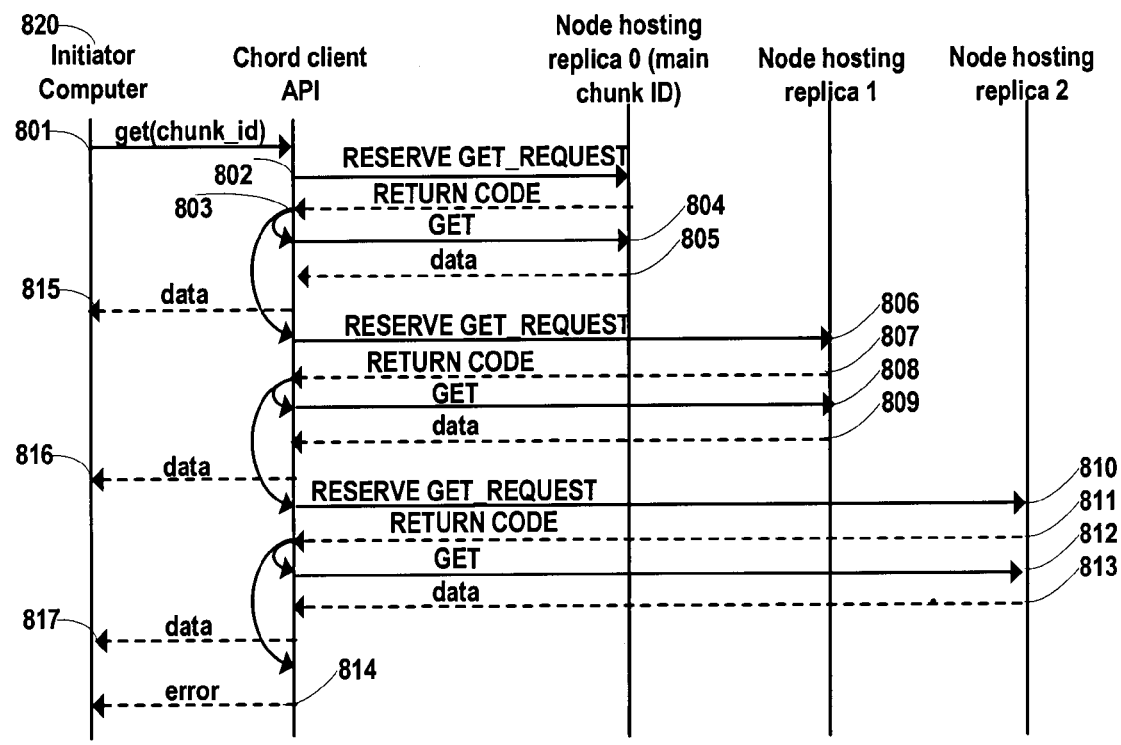
FIG. 8 illustrates an exemplary get transaction process within a multipurpose storage system, according to one embodiment.

FIG. 8 illustrates an exemplary get transaction process within a multipurpose storage system, according to one embodiment. An initiator computer 820 calls the get( )transaction process by using the Chord client API 801. A RESERVE request is then made for the given chunk ID 802. The transaction is then validated 802 by using the validation described in FIGS. 7*a* and 7*b*. In case of success 803 the data is fetched by the GET command 804 and sent back to the caller 805, 815. In case of failure 803 the operation is restarted for the next replica (806, 807, 808, 809, 816 and then 810, 811, 812, 813, 817). If none of the reservations have succeeded for any of the replicas, an error 814 is sent back to the initiator 820.

Figure 9:
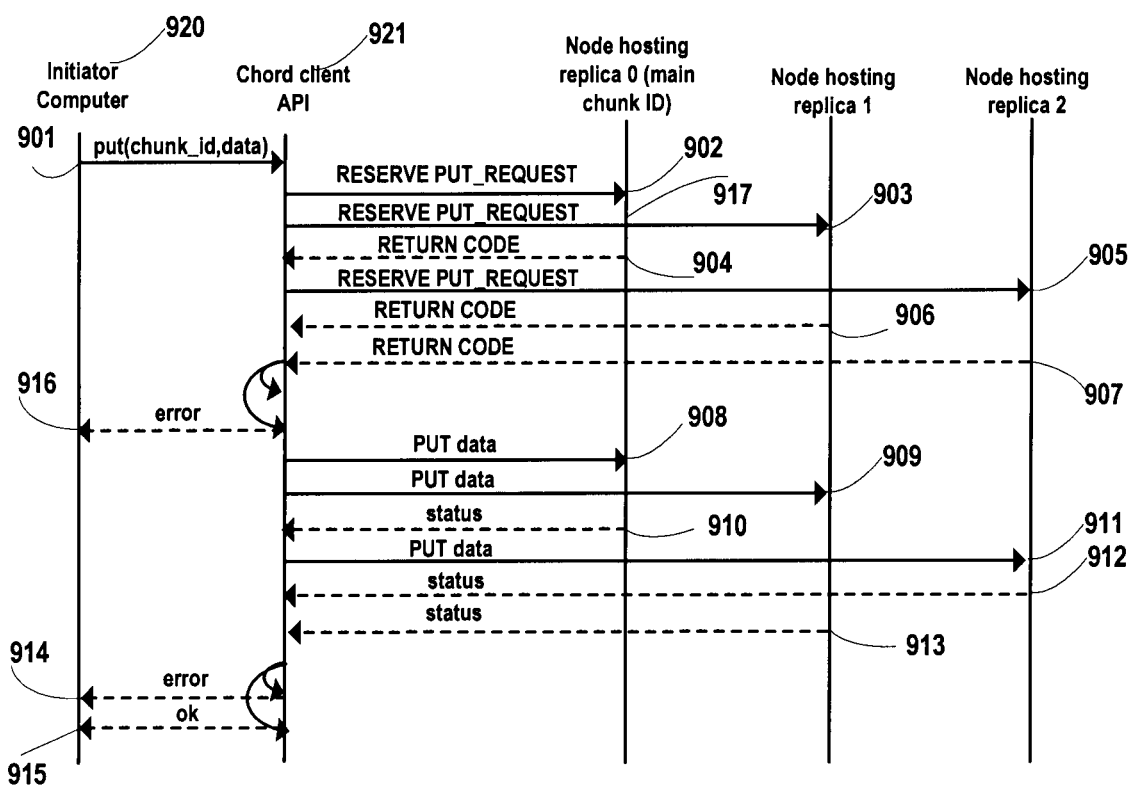
FIG. 9 illustrates an exemplary put transaction process within a multipurpose storage system, according to one embodiment.

FIG. 9 illustrates an exemplary put transaction process within a multipurpose storage system, according to one embodiment. An initiator computer 920 calls the put( ) transaction process 901 by using the Chord client API 921. This causes a RESERVE request to be made for all the replicas of the given chunk ID in parallel (902, 903, 905). The transaction is then validated 917 by using the validation described in FIGS. 7*a* and 7*b*. The Chord client API 821 waits for the success of all the reservations to the replicas to finish before starting putting data on the servers. In case of failure of the reservation for any of the replicas (indicated through return codes 904, 906, 907) an error is returned to the initiator 920 and the operation cancelled (914, 916). In the case of success, PUT commands are initiated in parallel (908, 909, 911). The Chord client API 921 decides to accept or cancel the operation depending of the number of put successes. Successes are determined using a status response from the nodes (910, 912, 913). By default all PUT must have succeeded but it is possible to accept a lower ratio (e.g. 2 successes out of 3) by changing an option in the Chord client API 921. Success returns an successful indication 915 to the initiator computer 920.

Figure 10:
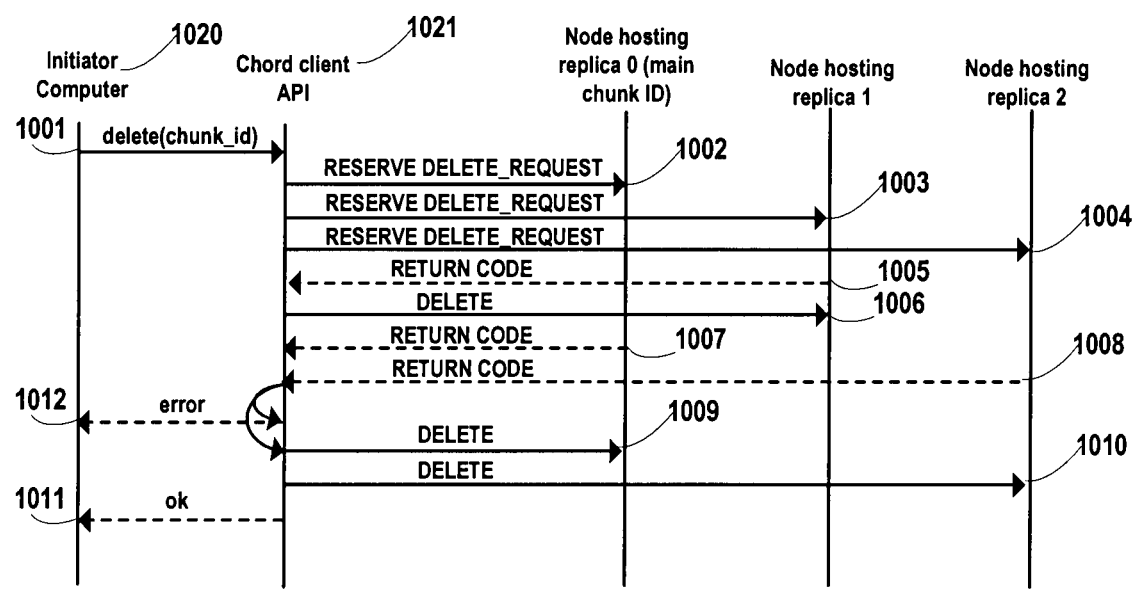
FIG. 10 illustrates an exemplary delete transaction process within a multipurpose storage system, according to one embodiment.

FIG. 10 illustrates an exemplary delete transaction process within a multipurpose storage system, according to one embodiment. An initiator computer 1020 calls the delete( ) transaction process 1001 by using the Chord client API 1021. Multiple parallel RESERVE requests are then sent to all the replicas of the given chunk ID (1002, 1003, 1004). The transaction is then validated by using the validation described in FIGS. 7*a* and 7*b*. The nodes return status codes (1005, 1007, 1008). In case of failure of all the replicas an error is returned 1012 to the initiator 1020, else the operation is a success (all replicas deleted 1006, 1009, 1010) and an indication of success is returned 1011 to the initiator computer 1020.

Since there may be many overlaps, there may be many proxies set for a node (client and server proxies). When operating on a chunk a node computer tries all the matching proxy ranges.

Figure 11:
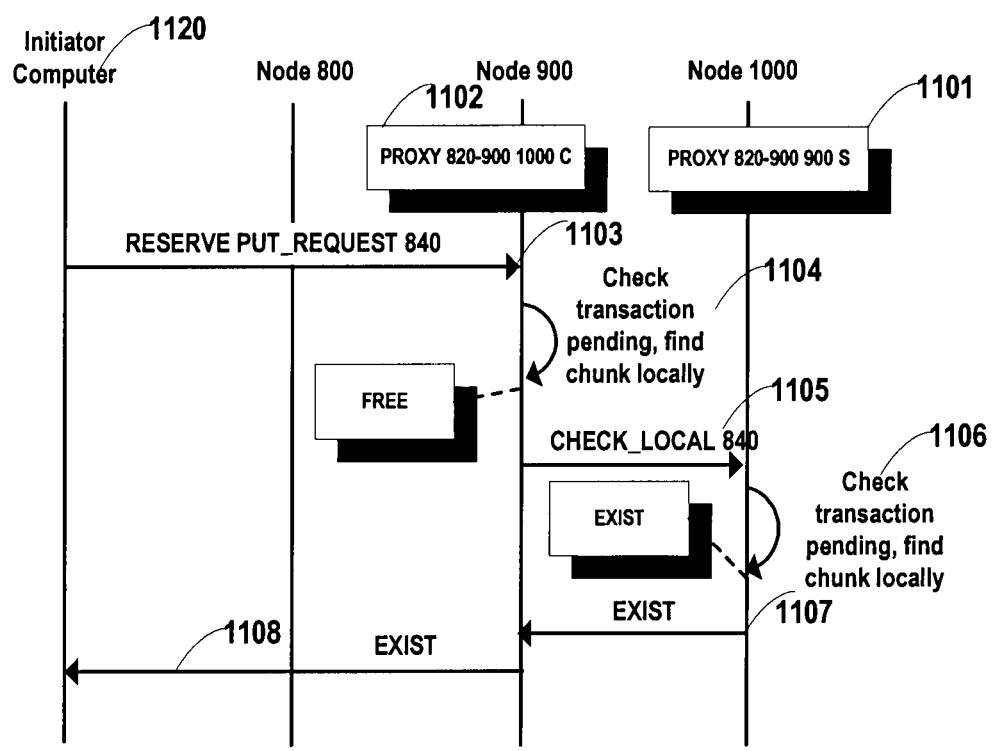
FIG. 11 illustrates an exemplary reservation in proxy mode within a multipurpose storage system, according to one embodiment.

FIG. 11 illustrates an exemplary reservation in proxy mode within a multipurpose storage system, according to one embodiment. A proxy is set 1101, 1102. Initiator computer 1120 sends the RESERVE command for a PUT_REQUEST transaction type 1103. In the example, the chunk ID is not found in the transaction table or on disk 1104. Because a proxy is set in the range of the chunk, the node 900 may check on the remote node with CHECK_LOCAL command 1105 that a transaction is not pending, and that the chunk does not exist on disk 1106. In an example where the chunk already exists 1107, an error code is sent 1108 to the initiator 1120. The system behavior is different for PUT_REQUEST, GET_REQUEST and DELETE_REQUEST transaction types. According to FIG. 7*b*, remote statuses are obtained by using CHECK_LOCAL on the remote node, 'X' and 'Y' are looked up as in FIG. 7*a*. For a READ_REQUEST, a transaction is kept only if there is 'X' on local node, or 'Y' on local node AND 'X' on remote node. For an INSERT_REQUEST, a transaction is kept only if there is an 'X' on local node AND 'X' on remote node. For a DELETE_REQUEST, a transaction kept only if there is an 'X' on local node.

If initiator computer 1120 had the wrong successor information then the RESERVE command targeted node 1000. In such a case, the behavior is the same as just described with regard to FIG. 11, except the wrong node 1000 is targeted first and the call to CHECK_LOCAL is made on the remote node 900 (information extracted from proxy information, server side).

Note this RESERVE operation may be done before any of the GET, PUT and DELETE commands as described below.

Figure 12:
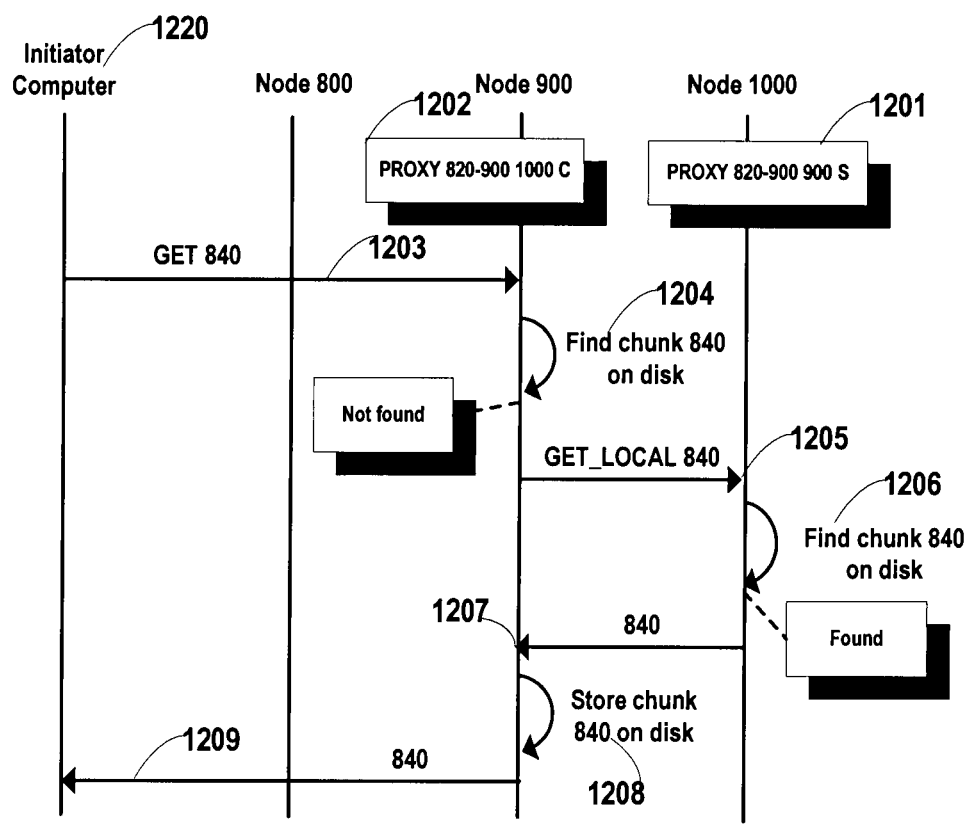
FIG. 12 illustrates an exemplary retrieval in proxy mode within a multipurpose storage system, according to one embodiment.

FIG. 12 illustrates an exemplary retrieval in proxy mode within a multipurpose storage system, according to one embodiment. According to this example, there is an overlap in chunks between nodes 900 and 1000 and the correct proxy information is set on both nodes 1201, 1202. An initiator computer 1220 asks for a chunk that might overlap 1203. A search for the chunk is first made on the local disk—but is not found 1204. The node 900 uses its proxy information to check if the chunk may be stored elsewhere. The chunk 840 may be on node 1000, so node 900 uses GET_LOCAL 1205 to fetch the chunk on node 1000. The chunk is found on the disk of node 1000 1206. The chunk is sent back to the successor of 840 1207. The chunk is stored on the fly on node 900's disk 1208 then sent back 1209 to initiator 1220.

According to one embodiment, 840 is already hosted by node 900. In such a case there would have been no need to search node 1000.

According to one embodiment, initiator computers still believe that successor of 840 is node 1000. In such a case the chunk might be still on 1000, so it would be fetched, or already be on 900. Node 1000 checks its proxy information 1201 to a GET_LOCAL on 900.

Figure 13A:
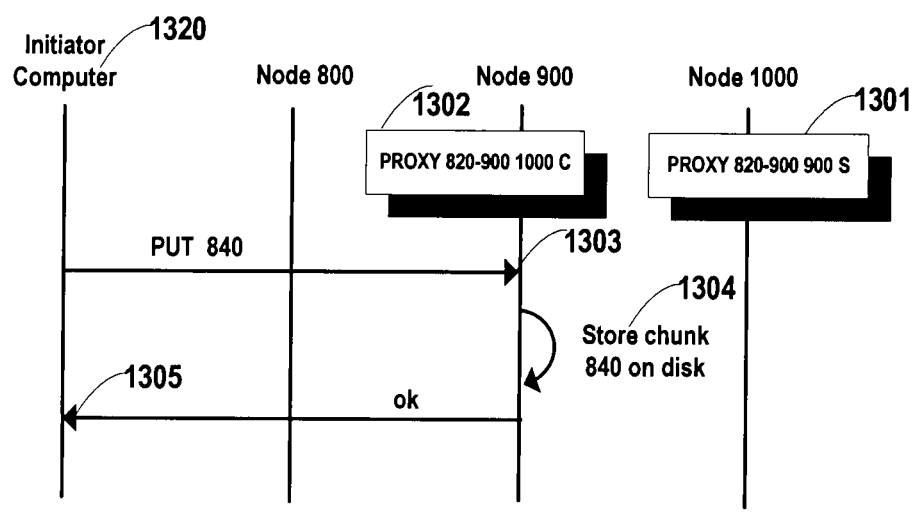
FIG. 13a illustrates an exemplary put operation within a multipurpose storage system, according to one embodiment.

FIG. 13*a* illustrates an exemplary PUT operation on a proxy client within a multipurpose storage system, according to one embodiment. Proxy information is set on both nodes 1301, 1302. An initiator computer 1320 requests that a chunk be written 1303. Note the RESERVE command has previously checked and reserved the chunks for writing. The node 900 targets the right successor for the chunk ID and no special action is required for the remote node, and the chunk is locally stored 1304. A success indicator is returned 1305 to the initiator 1320.

Figure 13B:
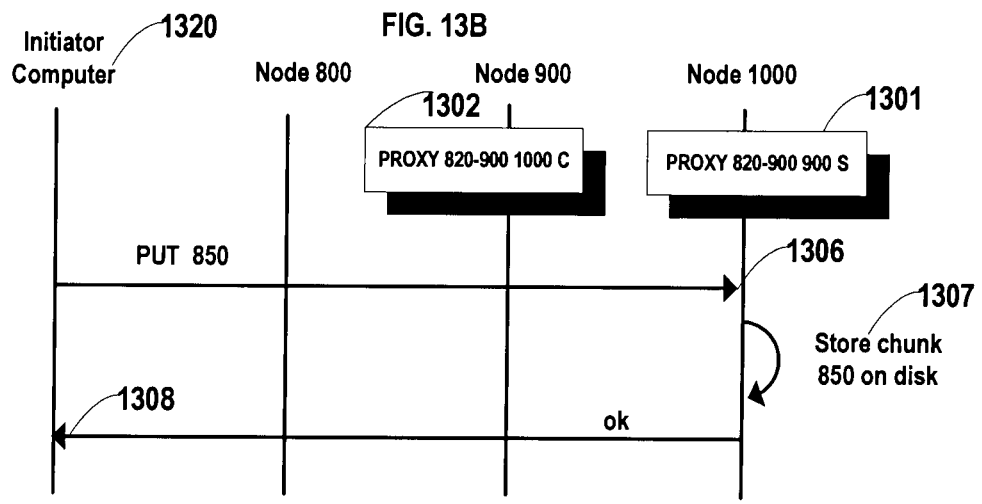
FIG. 13b illustrates an exemplary put operation within a multipurpose storage system, according to one embodiment.

FIG. 13*b* illustrates an exemplary PUT operation on a proxy server within a multipurpose storage system, according to one embodiment. Proxy information is set on both nodes 1301, 1302. An initiator computer 1320 requests that a chunk be written 1306 but has the wrong successor information. The chunk is stored on the disk of the wrong successor 1307, but will be accessible through the GET proxy command as in FIG. 12, or when a MOVE command is initiated as in FIG. 15. A success indicator is returned 1308 to the initiator 1320.

Figure 14:
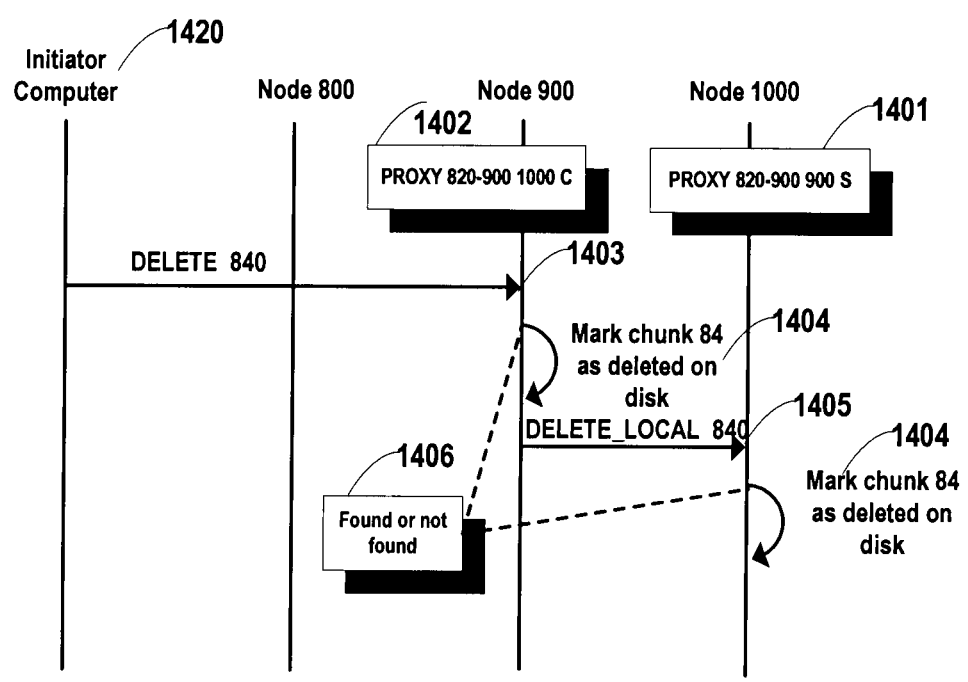
FIG. 14 illustrates an exemplary delete operation within a multipurpose storage system, according to one embodiment.

FIG. 14 illustrates an exemplary delete operation within a multipurpose storage system, according to one embodiment. There is an overlap in chunks between node 900 and 1000 and correct information is set on both nodes 1401, 1402. An initiator computer 1420 requests chunk 840 to be deleted 1403. Whether found or not 1406, the chunk is marked as deleted (content is emptied and a delete flag in set in chunk metadata) 1404. A DELETE_LOCAL request is also sent 1405 to the remote node in all cases and, found or not, the chunk is marked as deleted.

Figure 15:
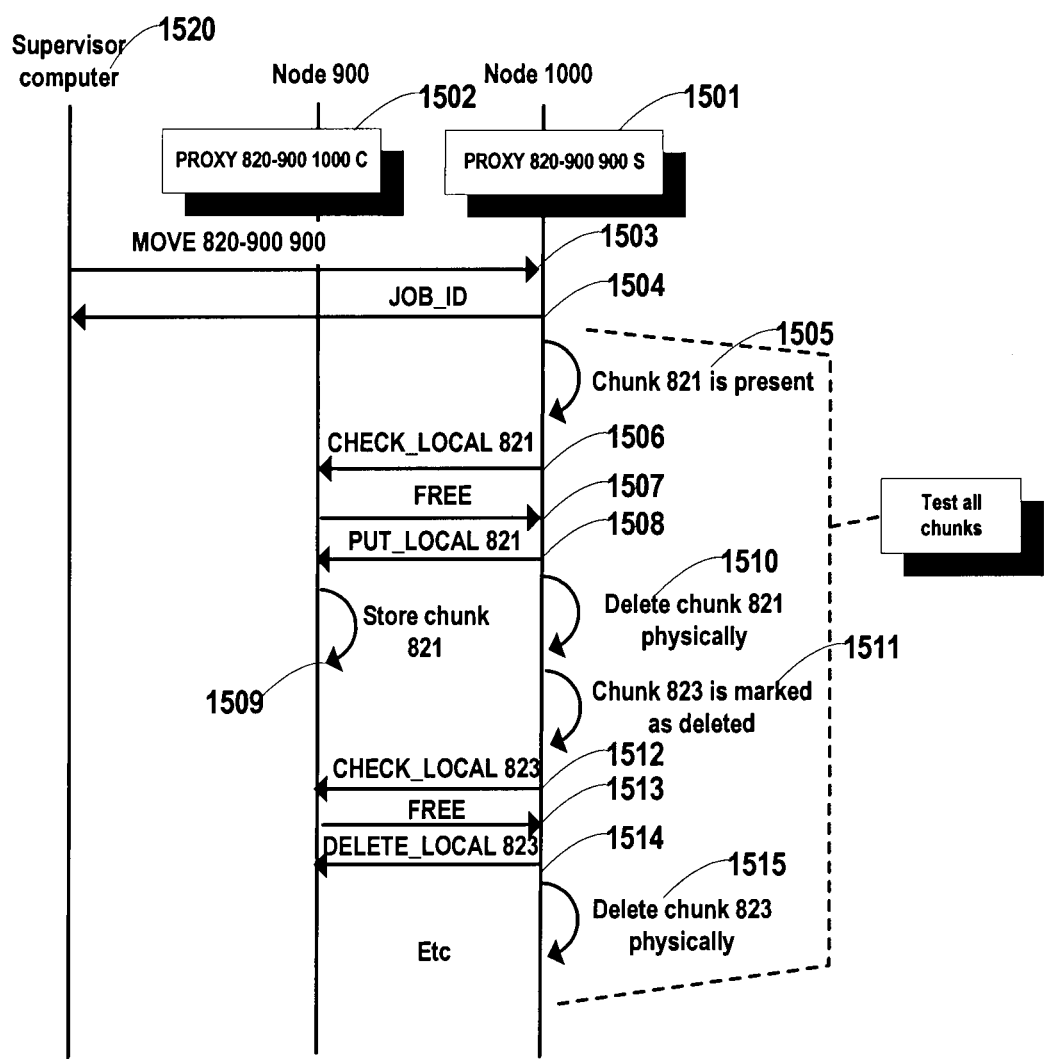
FIG. 15 illustrates an exemplary data move process within a multipurpose storage system, according to one embodiment.

FIG. 15 illustrates an exemplary data move process within a multipurpose storage system, according to one embodiment. A data move can be initiated upon overlap detection or for other reasons. A supervisor 1520 detects an overlap between nodes 900 and 1000 1501, 1502 and sends a MOVE command to move the misplaced chunks to the right node 1503. Note a MOVE can be initiated on a sub-range of the misplaced range. If the command is accepted then a job id is sent back 1504. The node 1000 then tests all chunks matching the range 1505 against the remote node with CHECK_LOCAL 1506. If the chunk does not exist 1507 then it is pushed with PUT_LOCAL 1508 and stored on disk 1509. It is then deleted physically on local disk 1510. Chunk 823 1511 is marked as deleted and checked 1512 on remote node 1513. The chunk is marked as deleted on the remote node with DELETE_LOCAL 1514. It is then locally physically deleted 1515.

Figure 16:
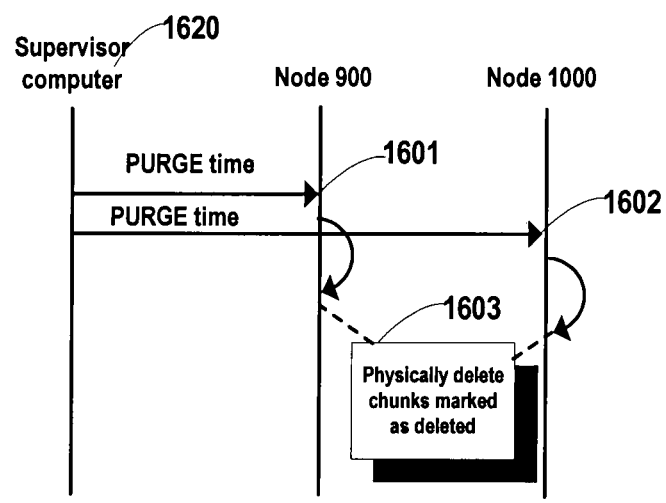
FIG. 16 illustrates an exemplary purge operation within a multipurpose storage system, according to one embodiment.

FIG. 16 illustrates an exemplary purge operation within a multipurpose storage system, according to one embodiment. A supervisor 1620 requests that chunk metadata is erased from a disk with the PURGE command 1601, 1602. Chunks marked as deleted are physically deleted 1603.

The purge operation is launched from time-to-time (controlled by supervisor computer) to erase physically the chunks marked as deleted older than a given time. The command is sent to all the nodes.

Figure 17:
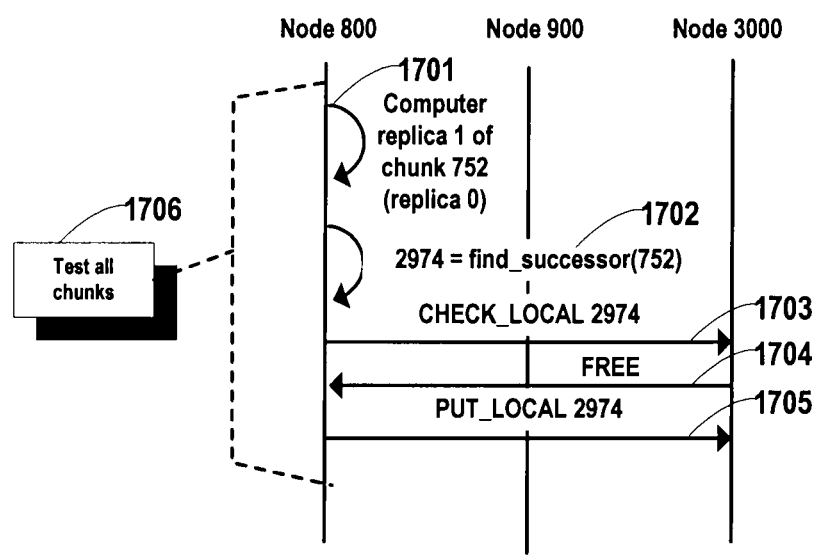
FIG. 17 illustrates an exemplary rebuild operation within a multipurpose storage system, according to one embodiment.

FIG. 17 illustrates an exemplary rebuild operation within a multipurpose storage system, according to one embodiment. The rebuild operation is launched automatically on node computers and can be deactivated by a supervisor computer. The rebuild operation checks each chunk 1706 to determine the presence of a replica N+1. According to this example, node 800 computes the replica of main chunk 752 1701, and the replica id is 2974. It is then checked against the node found with find_successor( ) 1702 and 1703. If replica is marked as free 1704 (e.g. for some reason the replica hasn't been created, or has been lost), it is recreated with a PUT_LOCAL 1705.

FIG. 18a illustrates an exemplary list of commands 1801 and their descriptions 1802 used for failover and transactional support extensions within a multipurpose storage system, according to one embodiment. Commands 1801 include, yet are not limited to, the following.
RESERVE TRANSID TRANSTYPE CHUNKID: Used to reserve a chunk id and replicas for transactions and return codes (explained below in FIGS. 18b and 18c).
GET TRANSID CHUNKID: Used to get a chunk or one of its replicas with a transaction.
GET_LOCAL CHUNKID: Used to get a chunk without a transaction.
PUT TRANSID CHUNKID: Used to put a chunk and all of its replicas with a transaction.
PUT_LOCAL CHUNKID: Used to put a chunk without a transaction.
DELETE TRANSID CHUNKID: Used to delete a chunk and its replicas with a transaction.
DELETE_LOCAL CHUNKID: Used to delete a chunk without a transaction.
CHECK_LOCAL CHUNKID: Used to check the status of a chunk (existence, deletion, transaction pending).

FIG. 18b illustrates an exemplary list of transaction types 1803 and their descriptions 1804 within a multipurpose storage system, according to one embodiment. Transaction types 1803 include, yet are not limited to, the following.
GET_REQUEST: Used to request retrieval of a chunk.
PUT_REQUEST: Used to request that a chunk be 'put' or stored.
DELETE_REQUEST: Used to request that a chunk be deleted.

FIG. 18c illustrates an exemplary list of return codes 1805 and their descriptions 1806 within a multipurpose storage system, according to one embodiment. Return codes 1805 include, yet are not limited to the following.
ERROR: Indication that a transaction validation failed.
TRANSEXIST: Indication that a transaction is already registered (for RESERVE only).
FREE: Indication that a chunk ID is available for operation.
EXIST: Indication that a chunk ID already exists on disk.
PENDING_GET: An indication that a 'get' transaction is pending.
PENDING_PUT: An indication that a 'put' transaction is pending.
PENDING_DELETE: An indication that a 'delete' transaction is pending.

FIG. 19 illustrates an exemplary list of commands 1901 and their descriptions 1902 used in supervisor protocol within a multipurpose storage system, according to one embodiment. Commands 1901 include, yet are not limited to the following.
ASSIGN ID: Used to assign a given ID to a new node.
COUNT X-Y: Used to count the chunks in the range X-Y
JOIN NIL|X: Used to tell a node to join a bootstrap node X or NIL if the node is first on a ring.
JOB_CANCEL X: Used to cancel a MOVE, PURGE, or REBUILD job.
LEAVE: Used to tell a node to leave a ring.
MOVE X-Y Z: Used to move the chunks in the range X-Y to Z.
PROXY X-Y Z C|S: Used to indicate that some chunks in the range X-Y are needed or available for or on Z (Server or Client).
PURGE TIME: Used to physically delete chunks older than TIME.
REBUILD TIME: Used to rebuild replicas N+1 for chunks older than TIME.
STATUS: Used to return various information on a node (ID, state, ranges).

Figure 20A:
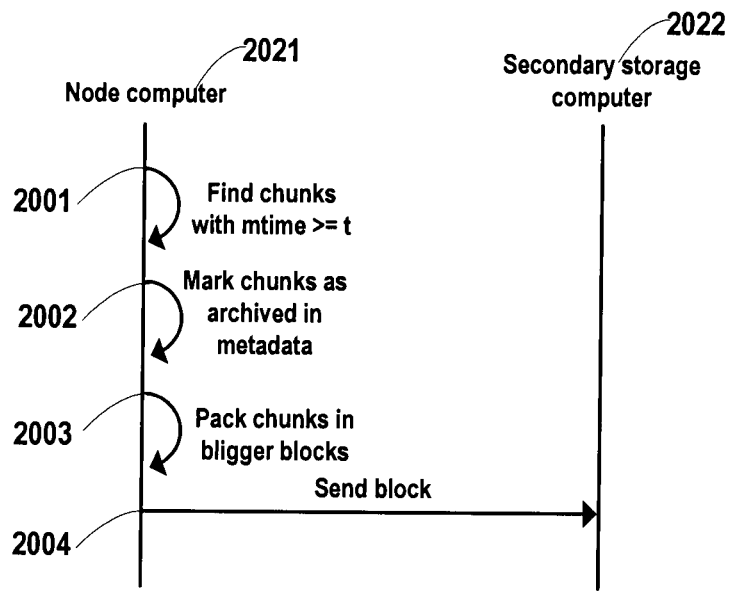
FIGS. 20a and 20b illustrate exemplary aging and packing mechanisms within a multipurpose storage system, according to one embodiment.

FIG. 20a illustrates an exemplary aging and packing mechanism within a multipurpose storage system, according to one embodiment. If activated, the packing process is automatically started on node computers 2021. Chunks are found with a modification time older than a specified timeout 2001. Chunks are marked as archived in metadata and contents are deleted 2002. A collection of chunks is packed into a bigger block 2003, and sent 2004 to a secondary storage system 2022.

Figure 20B:
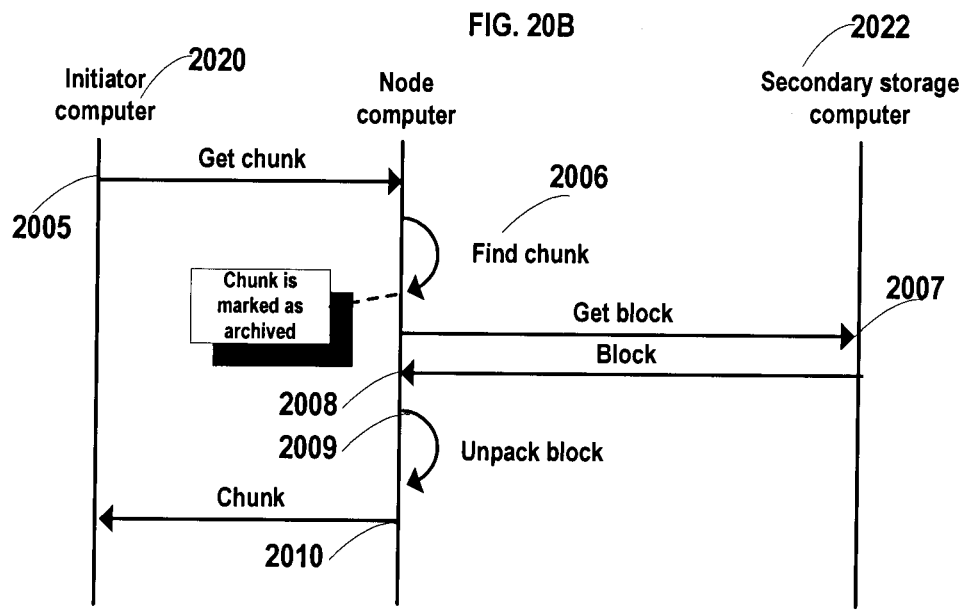

FIG. 20b illustrates an exemplary aging and packing mechanism within a multipurpose storage system, according to one embodiment. An initiator computer 2020 fetches a chunk 2005 that is archived 2006 (e.g. content is no longer present on the disk but the metadata is still present). Metadata contains information to fetch the block storing the chunk 2007 on secondary storage 2022 and 2008. A block is unpacked 2009 then sent back 2010 to the initiator 2020.

A multipurpose storage system based upon a distributed hashing mechanism with transactional support and failover capability have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A system, comprising:
   a client system in communication with a network;
   a secondary storage system in communication with the network; and
   a supervisor system in communication with the network, wherein the supervisor system assigns a unique identifier to a first node system; and
   places the first node system in communication with the network in a location computed by using hashing, wherein the client system stores a data object on the first node system,
   wherein the supervisor system detects overlap of data storage on the first and second node systems; and
   wherein the supervisor system sends correct data object range information to the first and second node systems.

2. A computer implemented method comprising:
   assigning a unique identifier to a first node system;
   placing the first node system in communication with a network in a location computed by using hashing, wherein a client system stores a data object on the first node system;
   detecting overlap of data storage on the first and second node systems; and sending correct data object range information to the first and second node systems.

3. The system of claim 1, wherein the network is a Chord based network.

4. The system of claim 1, wherein the secondary storage system is a Chord based network.

5. The system of claim 1, wherein the first node system detects and recovers from a plurality of node system failures over the network.

6. The system of claim 1, wherein one or more replicas of the data object are generated and stored on a second node system in communication with the network.

7. The system of claim 6, wherein unique identifiers are computed by the client system and assigned to the object and the one or more replicas of the data object.

8. The system of claim 6, wherein the client system initiates a transaction intended for the data object and a replica of the data object.

9. The system of claim 8 wherein the transaction is one of put, get, or delete operations.

10. The system of claim 6, wherein the first node system synchronizes the data object and the one or more replicas of the data object without a central component.

11. The system of claim 10 wherein the first node rebuilds a missing replica of the one or more replicas of the data object.

12. The system of claim 1, wherein the data object is stored in the secondary storage system.

13. The system of claim 1, wherein the data object is retrieved from the secondary storage system.

14. The system of claim 6, wherein the data object and the one or more replicas of the data object are retrieved from the first and second node systems.

15. The computer implemented method of claim 2, wherein the network is a Chord based network.

16. The computer implemented method of claim 2, wherein a secondary storage system in communication with the network is a Chord based network.

17. The computer implemented method of claim 2, wherein the first node system detects and recovers from a plurality of node system failures over the network.

18. The computer implemented method of claim 2, wherein one or more replicas of the data object are generated and stored on a second node system in communication with the network.

19. The computer implemented method of claim 18, wherein unique identifiers are computed by the client system and assigned to the data object and the one or more replicas of the data object.

20. The computer implemented method of claim 18, wherein the client system initiates a transaction intended for the data object and a replica of the data object.

21. The computer implemented method of claim 20 wherein the transaction is one of put, get, or delete operations.

22. The computer implemented method of claim 18, wherein the first node system synchronizes the data object and the one or more replicas of the data object without a central component.

23. The computer implemented method of claim 2, further comprising detecting overlap of data storage on the first and second node systems.

24. The computer implemented method of claim 22 wherein the first node rebuilds a missing replica of the one or more replicas of the data object.

25. The computer implemented method of claim 23, further comprising sending correct data object range information to the first and second node systems.

26. The computer implemented method of claim 2, wherein the data object is stored in the secondary storage system.

27. The computer implemented method of claim 26, wherein the data object is retrieved from the secondary storage system.

28. The computer implemented method of claim 18, wherein the data object and the one or more replicas of the data object are retrieved from the first and second node systems.

* * * * *